Feb. 24, 1925.
N. L. CLARKE
1,527,670
LOCKING VALVE
Filed Nov. 25, 1922
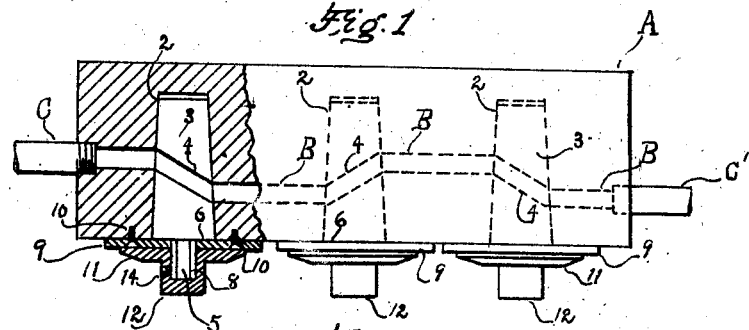
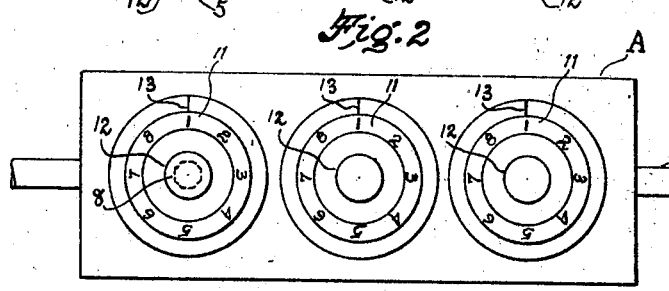
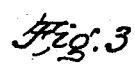
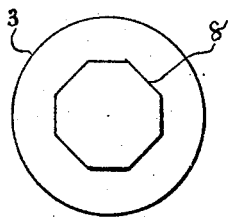
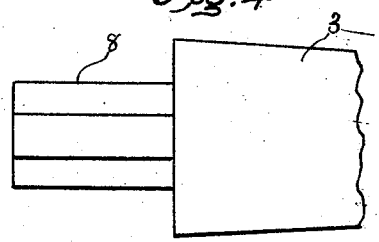
INVENTOR
Nathaniel L. Clarke
BY
F. N. Gilbert
ATTORNEY Patented Feb. 24, 1925.

1,527,670

UNITED STATES PATENT OFFICE.

NATHANIEL L. CLARKE, OF ENDWELL, NEW YORK.

LOCKING VALVE.

Application filed November 25, 1922. Serial No. 603,315.

*To all whom it may concern:*

Be it known that I, NATHANIEL L. CLARKE, a citizen of the United States, residing at Endwell, in the county of Broome and State of New York, have invented certain new and useful Improvements in Locking Valves, of which the following is a specification.

My invention relates to improvements in locking valves for controlling the flow of gasoline in automobiles and other mechanical devices and also for controlling the flow of other liquids; and another object is to provide a simple and most effective form of valve lock and yet most effective in all practical results.

With these and other objects in view, my invention consists in certain novel features of construction and arrangements of parts as will be hereinafter fully described and pointed out in the claims, reference being had to the accompanying drawings, in which:

Fig. 1 is a side view in cross section of my device.

Fig. 2 is a front view of my device.

Fig. 3 is a front view in cross section of my device.

Fig. 4 is a side view in cross section of a part of my device.

The same reference characters denote like parts in each of the several figures of the drawings.

In carrying out my invention, I provide a casing A, which may be mounted in any convenient manner in position for use, but in alinement with the channel flow of gas and so positioned as to form a part of the gas conduit and forming an intermediate part of the same at any convenient point. Thru the casing A, I provide a tubular channel B, irregular in its course and at one end of which I have means for connecting with the gas pipe C, in the inflow and at the other end connecting with the section C' for the gas outflow. Transversely with this channel in casing A, I have inset three bevelled tubular valve seats 2, in which I mount in any convenient manner the bevelled rotating valves 3 adapted to be properly fitted to the seats. Transversely thru the valve bodies 3 I have the sloping tubular openings 4 the opening ends in which are positioned in alinement with the adjacent openings in the transverse tubular channel B and forming part of the same. The tubular valve bodies 3 have at their outer end an outwardly projecting reduced stem extension 5, thereby, in this construction, forming a shoulder 6 on the valve body. The valve body 3 may be so constructed that the shoulder 6 is on a plane with the outer surface of the casing A or it may be of lesser length, than the valve seat and slightly below the surface of the casing A and thus forming a recess for the insertion of any suitable packing material. The stem 5 immediately adjacent to the shoulder 6 of valve 3 is circular in form 7, while beyond this round surface 7 it projects in octagonal form 8. Mounted over the stem 5 and shoulder 6 and extending to the surface of the casing A, I have mounted the plate 9 having a circular opening therein adapted to fit the rounded surface of the stem 5 and held in position by the screws 10 in one form of construction, mounted in the surface of the valve casing A. Over the octagonal section of stem 8, I mount the cap 11, its inner surface adjacent to the plate 9 and its outer surface projecting into the turn handle formation 12. This turn cap 12 may be mounted on stem 5 and held in position on stem 5, either by set screw 14 or by any other convenient method. On the face of plate 9, in any convenient position, I have the pointer mark 13 and on the outer surface of cap 10 I have marked a series of indicator numbers from 1 to 8 as shown in Fig. 2. In the union between the ends of the tube section and the casing A, I make the connection in any convenient manner, either by sockets let into the ends of the casing as shown in Fig. 1 or in any other convenient manner or by threaded connection or by soldering or brazing or in a manner making the tubing an integral part of the casing.

In the construction of my device as to the mounting of the valves and the method of turning the same, the position and mounting of the dials and the manipulation of the same in connection with the marker, I elect to use any other appropriate means for mounting an adjustment differing in details but without departing from the spirit of my invention.

In the operation of my device, the casing A having been properly positioned for use in connection with the gas conduit, I form a combination of numbers which I term, "the combination," indicating the position of opening a continuous gas conduit thru the casing. I then so turn the valve that the transverse openings therein are all in alinement with the tubular opening in the casing. I then after loosening and removing the dial cap 10 replace the dial cap so positioned that on each dial the particular combination number on the individual dial will stand under the marker above the dial. This combination number under the marker indicating to the outer number, which indicates the position of open valves. I then replace the cap and securely mount it as before, in this manner, "the combination numbers" are all in working position, the gasoline conduit is opened and thru the casing and free for the passage of the gasoline or other liquid. When I wish to close or lock the valve I turn each dial so that the secret combination number is out of alinement with the marker or turn the dial so that another number on each dial is in alinement with the marker; the valve is now closed or locked, a person not having the combination numbers cannot without great difficulty and expense of time so turn or manipulate the valves as to throw in to alinement the entire casing conduit and thus open or unlock the valve if at all.

Having thus described my invention, what I claim as new and for which I desire Letters Patent is as follows:

1. In a valve lock, a casing, a plurality of parallel bevelled, tubular valve seats, let into a side of the casing, transverse of the casing body, tubular openings between the ends and the casing, and between the valve seats, but out of alinement with each other, valve bodies mounted in the seats, each having a diagonal transverse opening therethru, adapted when the valve is turned to aline with the tubular openings in the valve seats, valve stems projecting from the valve bodies, plates provided with central openings for receiving the valve stems and adapted to be secured to the casing, and turn caps fitted over the ends of the valve stems and provided with indicating means to indicate the position of the valves.

2. In a valve lock, a casing formed of a solid block and provided with a plurality of recesses to receive valve plugs, said casing also provided with bores connecting the ends of the casing with the adjacent recesses and with bores connecting the recesses with each other, all of the bores being out of alinement, turning plugs mounted in the recesses each having a diagonal transverse bore therethrough for alinement with the bores in the valve casing, valve stems projecting from the turning plugs, plates provided with central openings for receiving the valve stems and adapted to be secured to the casing, there being a plate for each turning plug with indicating means thereon, and turn caps fitted over the ends of the valve stems and provided with indicating means for cooperation with the indicating means on the plates to indicate the position of the valves.

In testimony whereof I have affixed my signature.

NATHANIEL L. CLARKE.